Figure 3:
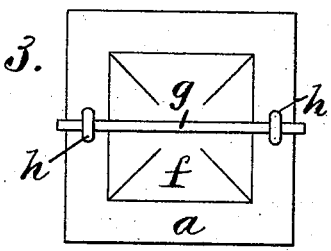

(No Model.)
2 Sheets—Sheet 1.
W. R. HINSDALE.
PROCESS OF FORMING INGOTS.
No. 444,381. Patented Jan. 6, 1891.
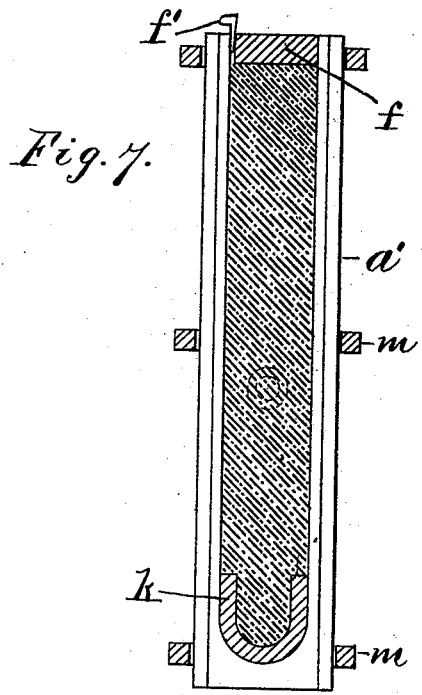
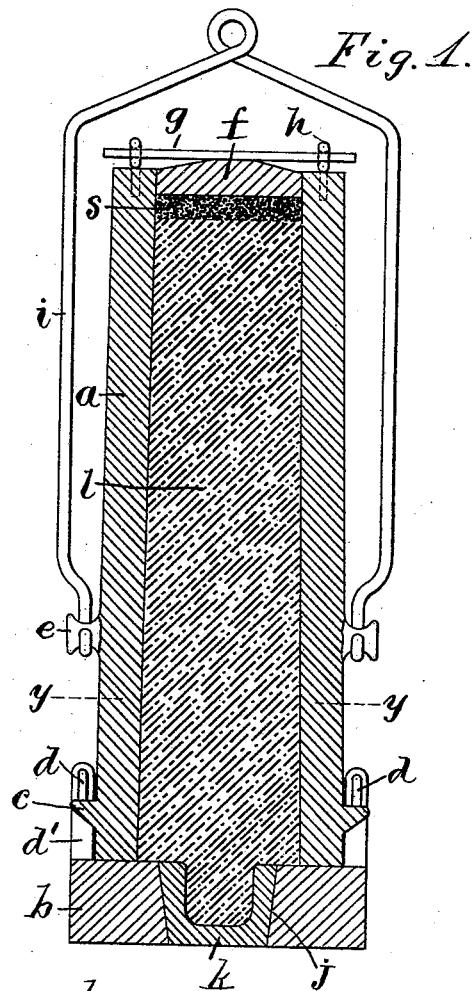
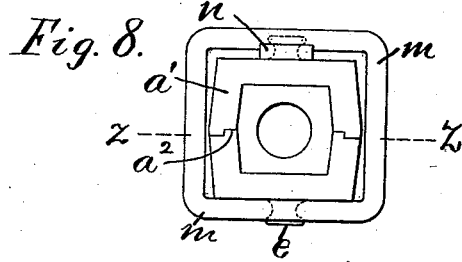
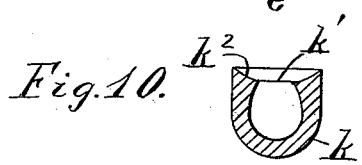
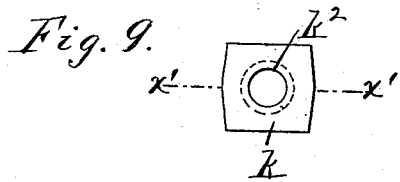
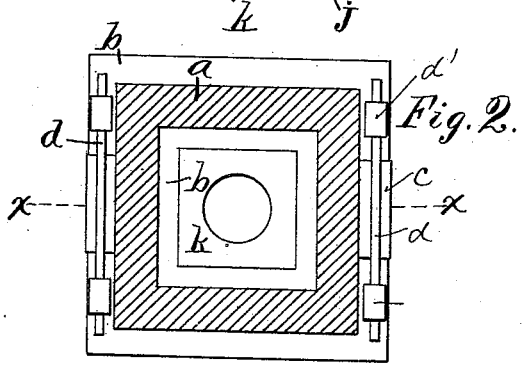
Attest:
L. Lee.
F. C. Fischer.
Inventor.
Wm. R. Hinsdale, per
Crane & Miller, attys.

(No Model.) 2 Sheets—Sheet 2.

W. R. HINSDALE.
PROCESS OF FORMING INGOTS.

No. 444,381. Patented Jan. 6, 1891.

Attest:
L. Lee,
F. C. Fischer.

Inventor.
Wm. R. Hinsdale
per Crane & Miller, Attys.

UNITED STATES PATENT OFFICE.

WILLIAM R. HINSDALE, OF JERSEY CITY, NEW JERSEY.

PROCESS OF FORMING INGOTS.

SPECIFICATION forming part of Letters Patent No. 444,381, dated January 6, 1891.

Application filed December 17, 1888. Renewed January 7, 1890. Again renewed July 19, 1890. Serial No. 359,338. (No specimens.)

*To all whom it may concern:*

Be it known that I, WILLIAM R. HINSDALE, a citizen of the United States, residing at Jersey City, Hudson county, New Jersey, have invented certain new and useful Improvements in Processes of Forming Ingots, fully described and represented in the following specification and the accompanying drawings, forming a part of the same.

In the formation of cast-steel ingots, especially those containing a large proportion of carbon, it is common for the shrinkage of the metal when poured in an ingot-mold to form a cavity or cavities in the upper end of the ingot, and, if such cavity be exposed to the atmosphere, its walls become speedily oxidized and in that condition are incapable of welding closely together. Such oxidation is especially liable to happen where the ingots are stored for some time before using, as the atmosphere in such case has a longer period in which to act upon the surfaces of the cavity, and the lack of union between the adjacent surfaces of the cavity when the ingot is rolled into a merchant bar commonly causes a serious defect therein.

The object of the present invention is partly to protect any cavities that may be formed within the ingots from the atmosphere during the cooling and shrinking period by hermetically sealing such cavities, so that when formed the ingot may be stored for any length of time before using without exposing such cavities to oxidation.

When steel ingots are cast in an open mold, a crust of chilled metal is formed at the mouth of the mold before any material shrinkage cavity occurs; but when a shrinkage cavity is formed beneath such open mouth the contraction and resulting vacuum causes the breakage of such crust and the admission of the atmosphere to the cavity.

In my invention the shrinkage cavity is not allowed to form beneath such thin crust, but is caused to form in a part of the ingot previously chilled in such degree that the skin cannot be ruptured by internal contraction or atmospheric pressure.

The invention consists in first chilling the top of the casting to exclude the atmosphere and in then turning the ingot before its interior is solidified into such position that the shrinkage cavity shall occur in contact with a chilled portion of the surface having sufficient strength to resist the strains caused by internal contraction and the consequent atmospheric pressure. By chilling the metal at the mouth of the mold and reversing the mold before the shrinkage occurs sufficiently to rupture the chilled surface the cavity is caused to be formed at the end of the mold opposite to its mouth, (which, by inversion, has become the top,) where it is fully protected from the atmosphere by the previous chilling of the surface metal, and can never be exposed to oxidation.

The invention also consists in a particular method for controlling the formation of the shrinkage cavity within a stud or projection at one end of the ingot, and so proportioned that the shrinkage cavity may be separated from the ingot with very little of the hardened metal.

It also consists in placing a heated cup, preferably of refractory material, like fire-brick, within the bottom of the mold, before pouring the fluid metal therein, to prevent the metal first poured into the mold from hardening too rapidly, and then invert the mold. By retaining the metal fluid in the bottom of the mold and then reversing the mold the formation of a cavity within that end of the ingot at the bottom end of the mold is greatly facilitated, as the metal, excepting the mere surface portion after the reversal of the mold, then flows readily downward from the inverted bottom of the mold and permits any confined gases to rise into the inverted cup, and determines the formation within the cup of any cavity caused by shrinkage.

Figure 4:
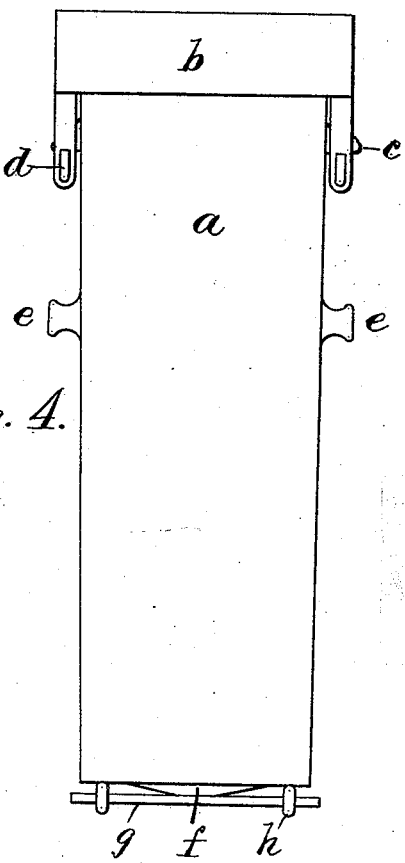
Figure 11:
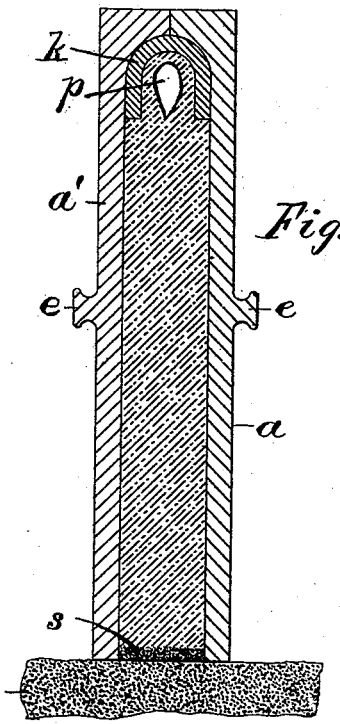
Figure 5:
Figure 6:
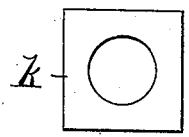

The invention is shown herein applied to a crucible mold and to a Bessemer mold, Fig. 1 of the drawings showing a Bessemer mold in vertical section on line *x x* in Fig. 2, and Fig. 2 being a section of the same on line *y y* in Fig. 1. Fig. 3 is a view of the top end of the Bessemer mold with cap applied. Fig. 4 is a side view of the Bessemer mold reversed. Figs. 5 and 6 represent in side view and plan the cup for the Bessemer mold. Fig. 7 represents a crucible mold parted at its longitudinal joint with the bands and the contents of the mold in vertical section on line *z z* in Fig. 8. Fig. 8 is a plan of the mold ready for pouring. Fig. 9 is a plan of the bottom cup for the crucible mold; Fig. 10 a section of the same on line $x'$ $x'$ in Fig. 9, and Fig. 11 is a vertical section transverse to the view shown in Fig. 7 of a crucible mold reversed.

$a$ is a Bessemer mold made in one piece with tapering bore, and provided with a base $b$, connected with the mold by lugs $c$ and keys $d$, inserted in studs $d'$. A cap $f$ is shown secured upon the mold by a rod inserted in eyes $h$, and trunnions $e$ are shown upon the sides of the mold to suspend the same by a bail $i$. A tapering hole $j$ is shown formed through the base, and a cup $k$, formed of fire-brick material, is shown fitted in such hole and serving to close the bottom of the mold, and at the same time to receive a small portion of its contents.

The mold $a$ is shown filled with fluid metal $l$, and some wet or moist sand $s$ is shown applied to the surface of the metal beneath the cap $f$.

The process of using such a mold is as follows: The mouth of the mold where the cap $f$ is applied being open, the cup $k$ is heated to redness and dropped in the hole $j$ in the base $b$. The mold is then filled nearly to the top with fluid metal $l$, the sand $s$ placed upon the top of such metal to chill the same, and the cover $f$ inserted in the mouth of the mold and locked in place by passing the rod $g$ through the eyes $h$. The bail $i$ is then lifted by suitable means to suspend the mold upon the trunnions $e$, and the mold is then turned with the mouth downward and the base $b$ upward, as shown in Fig. 4. The contact of the sand $s$ with the top of the metal operates to chill the surface thereof and quickly form a skin over the top of the ingot to retain the molten metal, and all the remaining surface of the ingot in contact with the walls of the mold is similarly chilled. In like manner the cup $k$, although heated, is colder than the fluid metal, and the metal in the cup $k$ being first poured therefore becomes exteriorly chilled before the mold is reversed. When the metal in the mold is cooled in a reverse position, any air-bubble or pipe formed by the shrinkage of the metal within the mold and formed in the upper end of the ingot is fully protected from oxidation by the skin or crust of chilled metal.

The cup $k$ for the Bessemer mold is shown detached in Figs. 5 and 6, and is made of tapering form to fit it easily within the aperture $j$ in the base and to permit of its ready removal.

In Figs. 7 to 11 is shown the means for practicing the invention with crucible steel molds, which are adapted commonly to hold from eighty to ninety pounds of steel, the contents of a single crucible. Such molds are shown formed in longitudinal halves $a'$, rabbeted together, as at $a^2$ in Fig. 8, and held together during the casting operation by bands $m$ and keys $n$. The mold is shown with trunnion $e$, formed upon the opposite halves $a'$, and the cup $k$ is shown of suitable dimensions to drop within the bore of the mold and with rounded bottom to fit the rounded form of the bottom commonly used in such molds. Such cup could be readily dropped in the mold from the top when heated, and serves an additional function in protecting the bottom of the mold from cutting when the metal is poured therein, which cutting injures the quality of the steel in the bottom of the ingot by the admixture of cast-iron.

In operating with so small a quantity of metal as the contents of one crucible very little precaution is required to hold the metal within the mold when reversed, as the surface of the metal at the mouth of the mold readily chills when the pouring is completed and forms a skin adapted to prevent the leakage of the metal when the mold is inverted.

In Fig. 7 the cap $f$ is shown secured in the mold by a wedge $f'$; but in Fig. 11 the mold is shown filled to its mouth above the fluid metal with damp or wet sand to chill the surface of the metal, which suffices to hold the metal in the mold when reversed, as shown in said figure. It is obvious that after the reversal of the mold, while its contents are fluid, the process of crystallization and subsequent shrinkage takes place precisely the same as in the ordinary open mold and with the same feeding downward of the fluid center to supply the shrinkage in the lower part of the ingot, leaving in the inverted mold a sealed cavity with bright surface, which may be either removed or welded up, as desired.

Fig. 11 shows a hollow cavity or pipe $p$, formed within the cup $k$ by such reversal and inclosed within a skin or shell of hardened metal in contact with the interior of the cup.

By proportioning the internal capacity of the cup to the volume of shrinkage in the ingot the portion of the ingot contained within the cup might be almost wholly filled by a cavity, so that when the ingot was cooled the removal of the projecting part formed in the cup would remove the entire pipe from the ingot and leave its body entirely sound.

Figs. 9 and 10 show a cup with its mouth $k'$ slightly contracted and the edges of the cup $k^2$ around the mouth beveled inward, so as to prevent the spattering of the metal on the walls of the mold and to effect a contracted neck at the junction with the ingot of the portion cast within the cup. Such construction greatly facilitates the breaking off from the ingot of the portion formed in the cup and leaves the end of the ingot in substantially the same shape as if it were cast in a round-bottom mold.

It is obvious that the practice of my invention in its broad scope is not limited to the reversal of the casting within the ingot-mold, as it is very common, while the interior of an ingot remains fluid, to remove the mold therefrom to promote its cooling. Such removal could not be effected unless the shell of the ingot were sufficiently chilled to bear handling and retain its form, and it is obvious that when the ingot is in this condition it may be readily reversed with the bottom end upward, and that the shrinkage cavity formed therein would occur adjacent to the former bottom of the ingot, where the crust is much thicker than at the top end, (which was last poured into the mold.) Such thick crust will not be liable to rupture under the pressure of the atmosphere or the internal contraction of the metal in cooling, which rupture generally occurs where the shrinkage cavity is formed at the hot upper end of the ingot. Such castings are preferably placed when reversed with their former upper ends in contact with a bed of sand to prevent any "bleeding" of the ingot in case the heated metal should remelt the thin crust formed at the top of the ingot.

I am aware that molds have been turned after forming a casting therein, for various purposes, as for shifting the cope over a thin casting and promoting the uniform shrinkage thereof, as in Patent No. 122,225, dated December 26, 1871, and for discharging the fluid core from the casting to produce a hollow shell or pipe, as in Patent No. 373,551, dated November 22, 1887. I hereby disclaim such invention, and it will be seen from the description of my invention that it differs materially from those just referred to.

It will be seen that my invention consists, essentially, in chilling the surface of the ingot which is last cast in the mold, and which is therefore the hottest, and in reversing the ingot after such surface is sufficiently chilled to exclude the atmosphere from the fluid interior of the ingot.

In my invention the retention of the fluid metal within the chilled shell is absolutely essential, whereas in the method of forming pipes set forth in United States Patent No. 373,551, the discharge of the fluid metal is the ultimate object, and the chilling of the top end of the casting before reversing the ingot, is carefully avoided.

I have not claimed herein the apparatus shown in the drawings, as I have claimed the same in a separate application filed December 20, 1890.

Having thus set forth the nature of my invention, what I claim is—

1. The process of forming ingots, which consists, first, in forming the casting in an ingot-mold; secondly, protecting the top of the casting from the atmosphere by chilling the same, and, thirdly, reversing the casting.

2. The process of forming ingots, which consists, first, in filling the ingot-mold; secondly, in excluding the atmosphere from the mouth of the mold, and, thirdly, reversing the mold, as and for the purpose set forth.

3. The process of forming ingots, which consists, first, in inserting a cup of heated material in the bottom of the mold; secondly, filling the mold, and, thirdly, reversing the mold, as and for the purpose set forth.

4. The process of forming ingots, which consists, first, in inserting a cup of heated material in the bottom of the mold; secondly, filling the mold; thirdly, excluding the atmosphere from the mouth of the mold, and, fourthly, reversing the mold, as and for the purpose set forth.

In testimony whereof I have hereunto set my hand in the presence of two subscribing witnesses.

WILLIAM R. HINSDALE.

Witnesses:
THOS. S. CRANE,
L. LEE.